United States Patent [19]

Pardoen et al.

[11] Patent Number: 5,382,924
[45] Date of Patent: Jan. 17, 1995

[54] CONTINUOUS PHASE FREQUENCY SHIFT KEYING MODULATOR

[75] Inventors: Matthijs D. Pardoen, Marin-Epagnier; John F. M. Gerrits, Cortaillod, both of Switzerland

[73] Assignee: CSEM Centre Suisse d'Electronique et de Microtechnique SA, Neuchatel, Switzerland

[21] Appl. No.: 130,232

[22] Filed: Oct. 1, 1993

[30] Foreign Application Priority Data

Oct. 2, 1992 [FR] France ................... 92 11939

[51] Int. Cl.[6] ............................ H04L 27/12
[52] U.S. Cl. ..................... 332/100; 332/101; 375/45; 375/62
[58] Field of Search ............ 332/100, 101, 102; 375/45, 62, 65, 66

[56] References Cited

U.S. PATENT DOCUMENTS 4,748,641  5/1988  Dapper ...................... 375/67
4,897,620  1/1990  Paradise .................... 332/100

FOREIGN PATENT DOCUMENTS 0169612  1/1986  European Pat. Off. .
0377180  7/1990  European Pat. Off. .
WO91/19360  12/1991  WIPO .

Primary Examiner—Siegfried H. Grimm
Attorney, Agent, or Firm—Griffin Butler Whisenhunt & Kurtossy

[57] ABSTRACT

A modulator is adapted for use in a transmitter of an information transmission signal in which the information is in the form of a frequency shift keyed code. The signal is centered on a fictional carrier frequency fc, on either side of which are emitted two actual frequencies separated from the frequency fc by Δf, according to whether the binary information has a high value (+1) or a low value (−1). A first generator (1) creates carrier signals in the form of $\sin(2\pi f_c t)$ and $\cos(2\pi f_c t)$. A second generator (6) creates, as a function of the information, modulation signals of the form $\sin(2\pi \Delta f t)$ and $\cos(2\pi \Delta f t)$ which are mixed with the carrier signals. At each transition of the information, first phase shifting means (8,14) modify by $k\pi$ the phase of one of the modulation signals. Second phase shifting means (8,9,10,12), simultaneously with the action of the first phase shifting means and at each transition of the information, change the sign of the argument of the modulation signals. The carrier signal is thus devoid of phase jumps.

6 Claims, 8 Drawing Sheets

CONTINUOUS PHASE FREQUENCY SHIFT KEYING MODULATOR

The present invention concerns information transmission systems using frequency shift keying.

The invention concerns, more particularly, a modulator which creates a carrier signal containing the information to be transmitted in the form of a frequency shifted code.

It is already known that if such a modulator operates according to a particular method of transmission by frequency shift keying or FSK, this method being known as "continuous phase", appreciable advantages are obtained. In particular, the continuous phase method allows the reduction of the side bands in the spectrum of the emitted signal, with respect to a modulator which does not operate according to the continuous phase method. A greater spectral efficiency of the signal is therefore obtained, which signifies that a greater amount of information can be transmitted in the same bandwidth.

It is also known (see the illustration of FIG. 1 in the attached drawings) that the transmission of information by FSK implies the emission of a fictional central frequency $f_c$ on either side of which are located two frequencies actually emitted $f_h$ and $f_b$ separated from the central frequency $f_c$ by a value $\Delta f$ and which are emitted respectively when the binary information has an upper value $+1$ and a lower value $-1$.

To obtain this result, the FSK modulator must be able to create two signals as a function of the level of the information signal to be transmitted. These signals are respectively given by the following mathematical expressions:

$$y_h(t) = A \cdot \sin(2\pi f_h \cdot t)$$

for
$D(t) = +1$,
and $$y_b(t) = A \cdot \sin(2\pi f_b \cdot t)$$

for
$D(t) = -1$

These two expressions can be written respectively:

$$y_h(t) = A \cdot [+\sin(2\pi \Delta f \cdot t) \cdot \cos(2\pi f_c \cdot t) + \cos(2\pi \Delta f \cdot t) \cdot \sin(2\pi f_c \cdot t)]$$

and $$y_b(t) = A \cdot [-\sin(2\pi \Delta f \cdot t) \cdot \cos(2\pi f_c \cdot t) + \cos(2\pi \Delta f \cdot t) \cdot \sin(2\pi f_c \cdot t)]$$

It can thus be seen that the transition from $f_h$ to $f_b$ or vice versa, by working with a central frequency $f_c = (f_b + f_h)/2$ and a modulation frequency $\Delta f = (f_h - f_b)/2$, can be obtained by changing the sign of the term $\sin(2\pi \Delta f \cdot t)$.

Thus, the modulator will be able to operate according to the principle of a zero intermediate frequency and must comprise, accordingly, means for mixing sine and cosine signals of the central frequency with sine and cosine signals of the modulation frequency, the sine modulation signal having to be altered by a phase shift of $\pi$ for each occurrence of a transition of the binary information signal D(t). The modulator must equally comprise addition means allowing the calculation of the sum of the two terms of the signals $y_b(t)$ and $Y_h(t)$.

It should be noted that the coefficient containing the modulation frequency $\Delta f$ of the two expressions for the signals y are called I(t) and Q(t), which are signals in quadrature having the form:

$$I(t) = D(t) \sin(2\pi \Delta f \cdot t)$$

and $$Q(t) = \cos(2\pi \Delta f \cdot t).$$

The phase inversion (the phase shift of an angle $\pi$) according to the signal I(t) at the occurrence of the transition of the signal D(t) implies a discontinuity in this signal, which appears in the signal y(t) obtained at the output of the modulator at a phase change. This runs counter to what is proposed to obtain for achieving the above indicated aim, that is to say, a phase continuous carrier signal.

In order to obtain phase continuity, one can synchronize the transition of the useful binary signal D(t) with the zero crossings of the FSK modulated output signal.

Such a method, operating with a carrier signal frequency 1500 Hz, has been already proposed in an article appearing in the review IEEE, Journal of Solid-State Circuits, by Bedrich J. Hosticka and al, Vol. Sc 19, no. 3 of June 1984. The realisation of a circuit permitting such a synchronization does not pose any particular problems.

However, in many applications, such as in the majority of professionnal telecommunication systems, the frequency of the carrier signal is substantially higher (for example in the order of 100 MHz). The synchronization method thus become prohibitive by reason of the considerable increase in the complexity of the circuit necessary for the modulator.

This inconvenience of the synchronization method can be reduced if a zero intermediate frequency is used, as is envisaged in the present invention. In fact, it is thus possible to synchronize the transition of the useful binary signal D(t) with the zero crossings of the signals I and Q at a frequency equal to the frequency deviation $\Delta f$.

This solution however presents another inconvenience, since it implies a limitation in the density of the information which can be modulated by the carrier signal. This inconvenience is particularly important when the frequency deviation $\Delta f$ is small.

The invention aims to create a phase continuous FSK modulator having a frequency equal to the frequency deviation $\Delta f$ instead of the carrier frequency $f_c$, this modulator not needing a synchronization method which would otherwise limit the density of information which is able to be transmitted.

The aim of the invention is thus a modulator for use in a transmitter of an information transmission carrier signal in which the information to be transmitted is in the form of frequency shift keyed code, said carrier signal being centred on a fictional frequency $f_c$, on either side of which are respectively emitted two real frequencies separated from the central frequency fc by a frequency $\Delta f$, according to whether the binary information has a high value or a low value, said modulator comprising:

first generator means for creating a first carrier signal having the form sin ($2\pi f_c t$) and a second carrier signal having the form cos ($2\pi f_c t$), second generator means for creating, respectively as a function of the level of the binary information to be transmitted, a first modulation signal I(t) having the form sin ($2\pi \Delta ft$) and a second modulation signal Q(t) having the form cos ($2\pi \Delta ft$), first multiplication means for mixing the first carrier signal and the first modulation signal, second multiplication means for mixing the second carrier signal and the second modulation signal, and means for adding the output signals of said multiplication means and thus creating said signal to be transmitted, said modulator being characterized in that said second generator means comprise:

first phase shifting means for, at each transition of said binary information, modifying the phase of said first modulation signal by a value $k\pi$, k being any odd number, and second phase shifting means for, simultaneously with the action of said first phase shifting means and at each transition of said binary information, changing the sign of the arguments of said first and second modulation signals.

From these characteristics, the respective amplitude of the two modulation signals I(t) and Q(t) remain constant just before and after each transition of the binary information, as a result of which the modulated carrier signal has, at the moment of each frequency change due to a transition of the binary information, no phase discontinuity, no matter when the transition occurs with respect to the modulation signals I(t) and/or Q(t).

Other characteristics and advantages of the invention will appear during the course of the description which follows of several embodiments of the invention, this description being given as an example only and making reference to the attached drawings in which.

Figure 2:
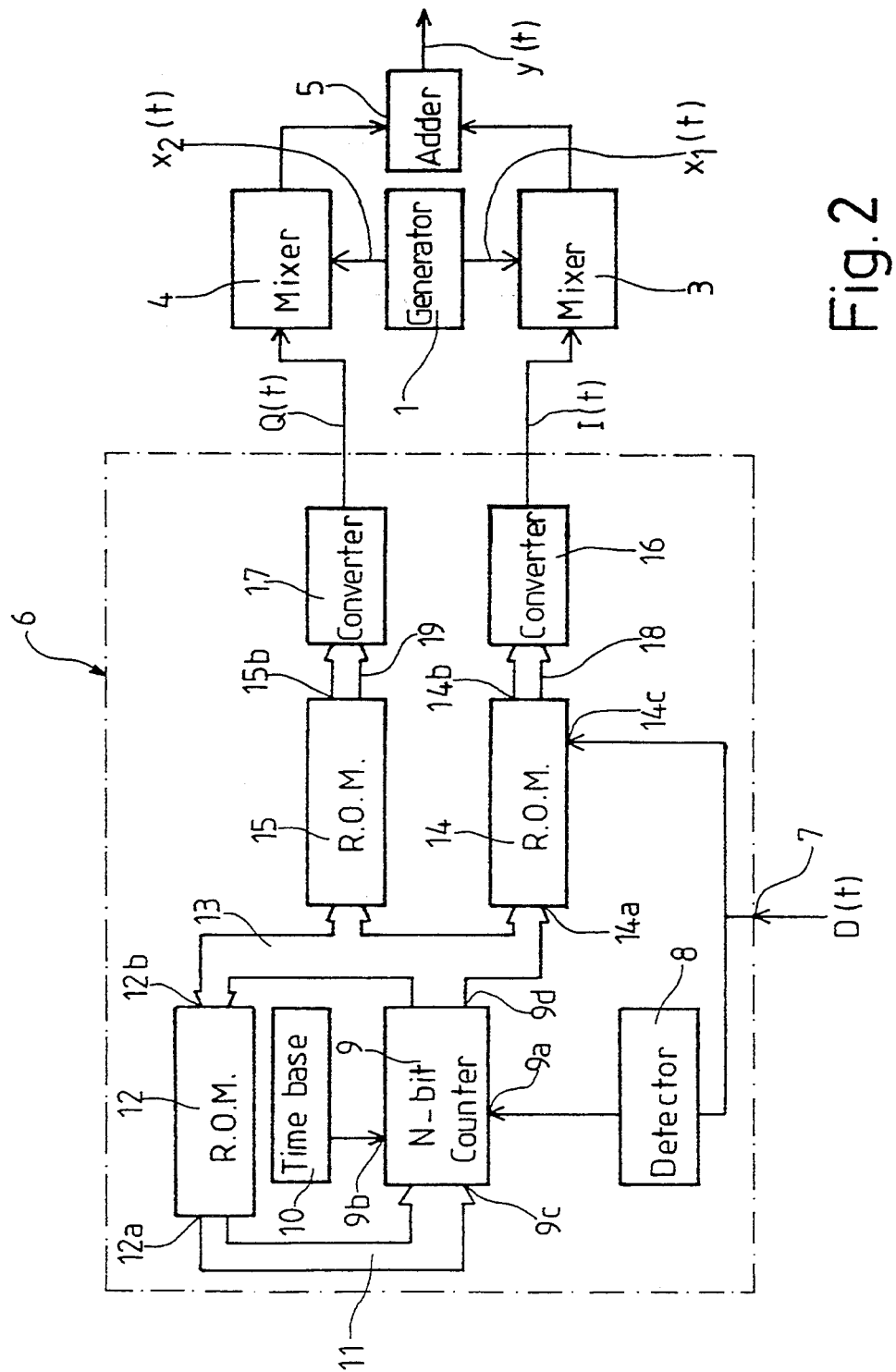
FIG. 2 is a simplified schematic diagram of a first embodiment of a modulator according to the invention operating in digital mode.

FIG. 2 will now be referred to, this figure representing schematically a first digital version of a modulator according to the invention.

The modulator comprises a first generator 1 for creating a signal $X_1(t) = \cos(2\pi f_c \cdot t)$, $f_c$ being the central carrier frequency of the FSK signal to be transmitted, and a second signal $X_2(t) = \sin(2\pi f_c \cdot t)$ in quadrature with the signal $X_1(t)$.

The generator 1, as with all the other circuits which will be described subsequently, is conceived in a classic manner and can be realized for example in the form of a CMOS integrated circuit, the design of which will be appreciated by a man skilled in the art he is provided with the functions which, according to the present invention, must be put into operation.

The generator 1 is connected to two mixers 3 and 4 which combine with the signals $X_1(t) = \cos(2\pi f_c \cdot t)$ and $X_2(t) = \sin(2\pi f_c \cdot t)$, respectively two modulation signals called I and Q signals.

The output signals of the mixers 3 and 4 are applied to an adder 5 which creates a signal y(t) of the form:

$$y(t) = I(t) \cos(2\pi f_c t) + Q(t) \sin(2\pi f_c t)$$

The signals I and Q are created in a second modulation signal generator 6 to which is applied, by an input 7, the binary signal D(t) representative of the binary information to be transmitted in the signal y(t).

By simplifying the expressions for the signals I(t) and Q(t), we can write:

$$I(t) = A[D(t)] \sin\{\alpha[t, D(t)]\}$$

and $$Q(t) = B[D(t)] \cos\{\beta[t, D(t)]\}$$

in which D(t) represents the binary information which is transmitted, that being a binary "+1" or a binary "−1". The transmitted frequency for D(t) = +1 will be $f_c + \Delta f$ and for D(t) = −1, will be $f_c - \Delta f$ (the inverse being naturally able to be envisaged).

It can be seen that the amplitude A of the sine term and the amplitude B of the cosine term are functions of the useful signal D(t), and that the argument $\alpha$ of the sine and the argument $\beta$ of the cosine are functions of time t as well as of the useful binary information D(t).

In the embodiment of the invention represented in FIG. 2, the functions A, B, $\alpha$ and $\beta$ have the following forms for the steady state case, which exists from when power is first supplied to the modulator until the moment of the first transition of the binary information signal D(t):

$$A(t) = D(t) \qquad \alpha[t, D(t)] = \alpha_o + 2\pi \Delta ft$$
$$B(t) = 1 \qquad \beta(t) = \beta_o + 2\pi \Delta ft$$

in which $\alpha_o = \beta_o$ signifies the phase at the moment t=0.

In these conditions, by allowing that $a_o = b_o = 0$, the signal y(t) has the form:

$$yh(t) = \sin[2\pi(f_c + \Delta f)t]$$

when
 D(t) = +1 and $$yb(t) = \sin[2\pi(f_c - \Delta f)t]$$

when
 D(t) = −1
as well as $$I(t) = D(t) \sin(2\pi \Delta ft)$$

and $$Q(t) = \cos(2\pi \Delta ft)$$

which can be written with $\theta(t) = 2\pi \Delta ft$:

$$I(t) = D(t) \sin[\theta(t)]$$

and $$Q(t) = \cos[\theta(t)],$$

$\theta$ being able to vary between $-\pi$ and $+\pi$.

As a result, the role of the second modulation signal generator 6 consists of creating the signals I(t) and Q(t), with as a particular condition, realized according to the present invention, that no transition of the useful signal D(t) causes a phase change in the output signal y(t).

To obtain this result, the generator 6 is such that neither the signal I(t) nor the signal Q(t) has a discontinuity for all transitions of the signal D(t).

Figure 1:
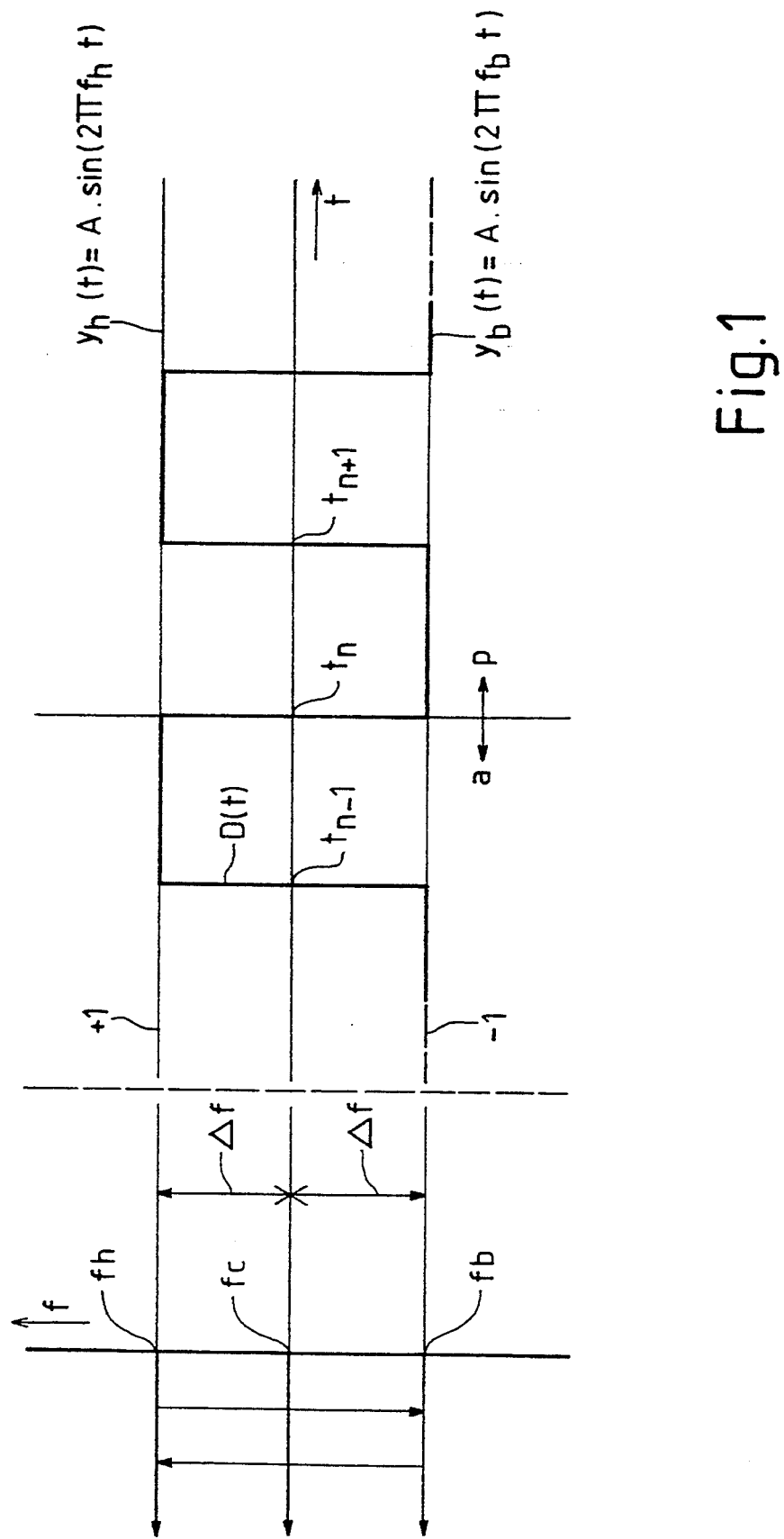
FIG. 1 represents a diagram illustrating the principle of operation of the transmission of information according to FSK signals.

As represented in FIG. 1, the $n^{th}$ transition of the binary information signal is represented by $t_n$, the value of the variables just before the $n^{th}$ transition being represented by the index "a" and the value of the variable just after the $n^{th}$ transition being represented by the index "p".

According to the invention the generator 6 elaborates at each transition of the signal D(t) the signals I(t) and Q(t) such that:

$$I_{na} = I_{np} \text{ and } Q_{na} = Q_{np}.$$

These two equalities are satisfied, according to the invention, under two conditions, these being:
- the function I(t) goes through a phase change of $k\pi$ (k being any odd number), which amounts to an inversion of the sign of the signal I(t).
- the arguments of the two functions I(t) and Q(t) undergo a common inversion such that $\alpha_{na} = -\alpha_{np}$ and $\beta_{na} = -\beta_{np}$ (with $\alpha = \beta = \theta$);

These two conditions are put to effect in the digital assembly of the generator 6 represented as example in FIG. 2.

The generator 6 comprises firstly a detector 8 of the transitions of the signal D(t) which is applied thereto by means of the input 7.

The output signal of the detector 8 is applied to the loading control input 9a of a N bits counter 9 whose contents represent the instantaneous value of the angles $\alpha$ and $\beta$ ($\alpha = \beta$) situated between $-\pi$ and $+\pi$. The counter 9 is connected to a time base 10 supplying a clock signal CLK to the input 9b of the counter.

The counter further comprises a load input 9c to which may be applied a binary signal having N bits in parallel representing the value of the phase angle $\alpha_{np}$.

The input 9c of the counter 9 is connected, by means of a bus 11 having N bits, at the data output 12a of a ROM memory 12 which constitutes a table of values of phase angles.

The ROM memory 12 further comprises an address input 12b which is connected by means of a bus 13 having a width N, to the output 9d of the phase angle counter 9.

Figure 4:
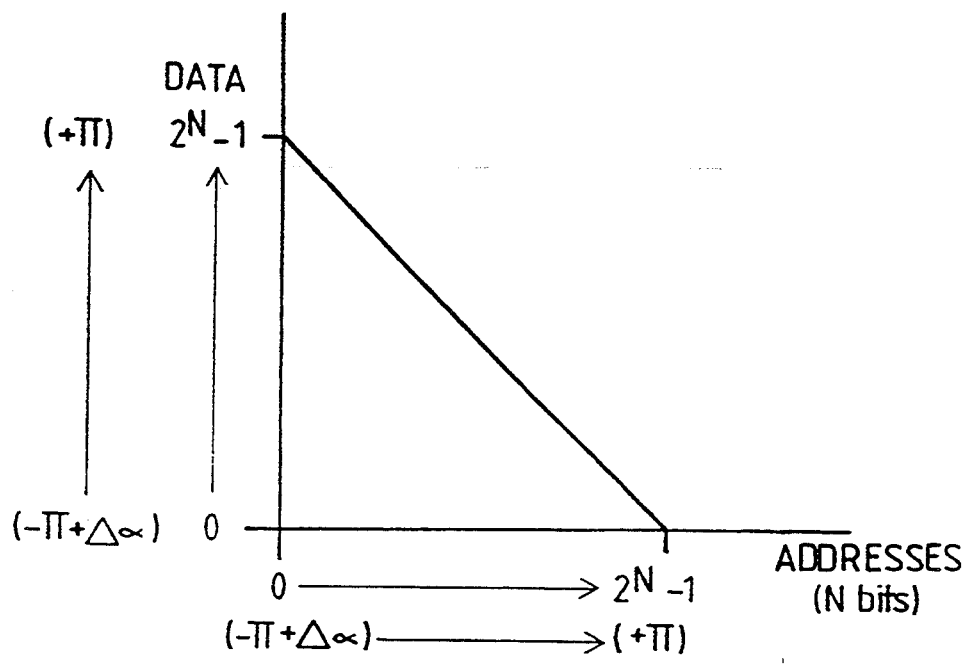
FIG. 4 represents graphically the manner in which the data is developed in a ROM memory used in the modulator of FIG. 2.

In other words, the ROM memory may be addressed with $2^N$ binary values (256 for example if N=8) situated between 0 and $2^N - 1$ corresponding to that many values of the angle $\alpha$ between $-\pi + \Delta\alpha$ and $+\pi$, where $\Delta\alpha$ corresponds to the phase increment between two consecutive addresses (see FIG. 4).

Each of these address values corresponds to data values situated between 0 and $2^N - 1$ corresponding to that many new values of $\alpha$ and $\beta$ situated between $-\pi + \Delta\alpha$ and $+\pi$.

The increment $\Delta\alpha$ is equal to $$\Delta\alpha = \frac{2\pi}{2^N} = \pi 2^{-N+1}$$

As a consequence, the ROM memory 12 performs the function $\alpha_{np} = -\alpha_{na}$.

It should be noted that the ROM memory 12 may be replaced by any other assembly realizing the inversion of the sign of the instantaneous angle $\alpha$. For example, a series of N inverters appropriately connected together may be imagined. Such an assembly has not been described in detail here, its construction being within the knowledge of a man skilled in the art.

Thus, in the absence of transition of the input signal D(t) to the input 7 of the generator 6, the contents of the counter 9 increase progressively from 0 to $2^N - 1$, representing a step increase of $\Delta\alpha$ between $-\pi \Delta\alpha$ and $+\pi$, at a rate set by the clock signal CLK. When the value $+\pi$ is attained, the counter 9 once again takes the value $-\pi + \Delta\alpha$ at the following clock pulse.

The bus 13 is also connected to two other ROM memories 14 and 15 by means of their address inputs 14a and 15a.

Figure 5:
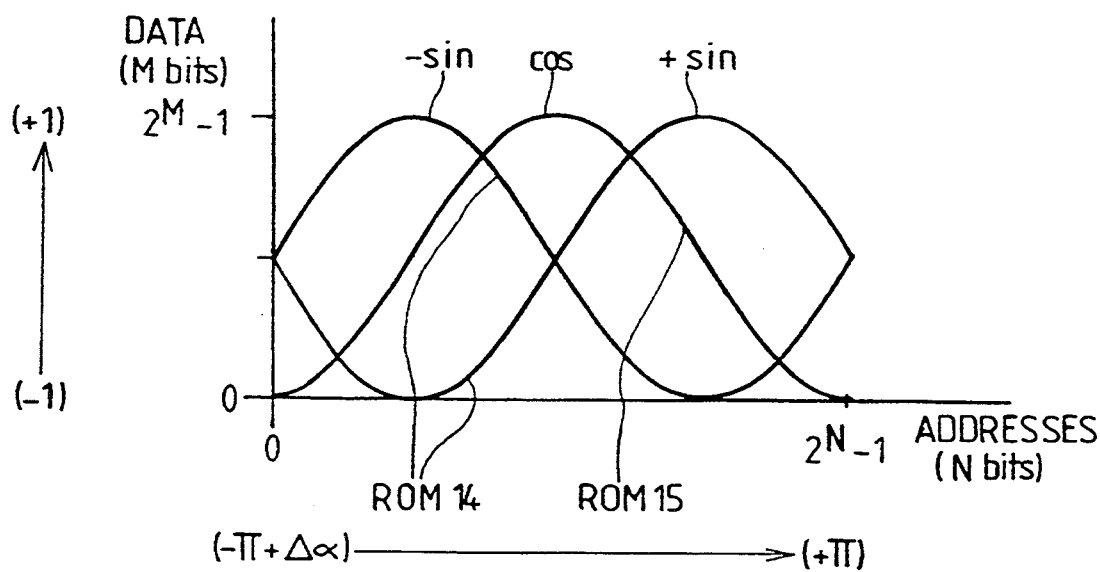
FIG. 5 shows graphically the manner in which the data is developed in another ROM memory used in the modulator of FIG. 2.

The contents of the ROMs 14 and 15 are symbolized by the FIG. 5. The addresses of each of the memories evolves between the angle values $-\pi + \Delta\alpha$ and $+\pi$ with an increment equal to $\Delta\alpha$ corresponding to the output of the counter 9.

The address values evolve between 0 and $2^N - 1$.

The data corresponding to these addresses differ from each other in the ROM memories 14 and 15.

In the memory 14 $2^N + 1$ binary words of M bits are stored whose values represent respectively the sine and the minus sine evolving between $-1$ and $+1$ and which are addressable as a function of the values of the angle $\alpha$ applied to the input 14a. The number M may be equal to or different from N.

As represented in FIG. 2, the input signal D(t) is applied, by means of the input 7, to a data group control input 14c of the ROM memory 14. In fact, this memory includes a data group representing the sine function, another group representing the minus sine function and a further group representing the cosine function, conforming to what is represented in FIG. 5. These groups are addressed respectively from the moment the signal D(t) has either a positive or a negative value.

In the memory 15 $2^N$ binary words of M bits whose values represent the evolution of the cosine between $-1$ and $+1$ (see FIG. 4), these binary words being addressable respectively as a function of the value of the angle $\alpha$ contained in the counter 9.

The outputs 14b and 15b of memories 14 and 15 are thus M bits binary words representing the values of a sine and of a cosine as a function of the angles $\alpha$ and $\beta$ that it suffices to apply to respective digital/analog converters 16 and 17 by means of respective buses 18 and 19, in order to obtain the signals I(t) and Q(t) having the desired form.

The frequency Δf of these signals will depend firstly on the frequency $f_{ck}$ of the clock 10, applied to the counter 9 and secondly on the number of bits N of this counter. In other words:

$$\Delta f = \frac{f_{ck}}{2^N}$$

If the number of bits of the counter 9 is equal to 8, the frequency $\Delta f = f_{ck}/256$.

The operation of the modulator of FIG. 2 will now be described with reference to the diagram of waveforms of FIG. 3.

Figure 3:
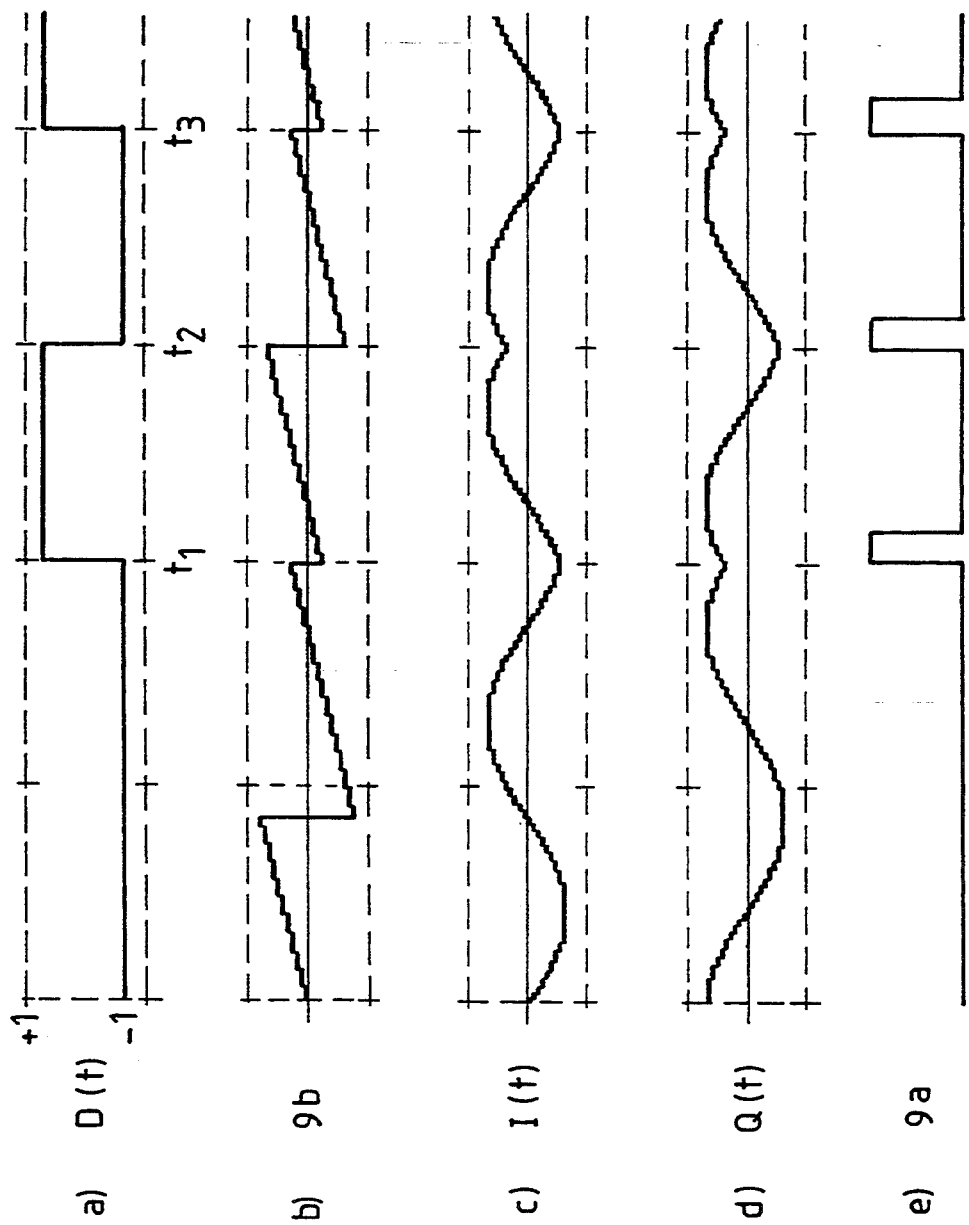
FIG. 3 is a diagram showing, as a function of time, certain waveforms appearing in the modulator of FIG. 2.

Whilst there are no transition of the binary informations D(t), that is to say in the example of FIG. 3 until the time $t_1$ (curve a), the contents of the counter 9 increase periodically from 0 to its maximum value $2^N - 1$ under the action of the clock signal which is applied thereto by the input 9b (curve b). Each step of the counter 9 corresponds to the search in the memories 14 and 15 of a sine and a cosine value in such a way that the converters 16 and 17 are able to produce the corresponding sinusoidal and cosinusoidal curves of the signals I(t) and Q(t) respectively (curves c and d).

Simultaneously, the value of the angle α corresponding to the present position of the counter 9 is applied as an address to the ROM memory 12, which supplies each time at its data output the negative value of this angle α.

However, in the absence of a transition of the information signal D(t), this negative value is inoperative.

At the time $t_1$, a transition occurs (in the example of FIG. 3, this goes from $-1$ to $+1$, curve a), the input 9a of the counter 9 is activated by the edge detector and the data $(-\alpha)$ supplied at this moment by the ROM memory 12 is charged in the counter 9 thereby effacing its previous contents.

Simultaneously, the information signal D(t) applied to the ROM memory 14 provokes the application to the converter 16 of the sine value corresponding to the table in the ROM memory 14 representing the sinusoidal curve having a sign opposite to that of the curve contained in the table of that memory which was consulted just before the transition of the signal D(t).

It can be seen then, in these conditions, that the signal I(t) has no discontinuity.

This also is the case for the signal Q(t) (curve d, FIG. 3), since the value of the angle $-\alpha$ issuing from the counter 9 will correspond in the table of the memory 15 to the same cosinusoidal value which is applied for this memory to the converter 17.

At the time $t_2$, an inverse transition occurs in the signal D(t), the process is the same in that the ROM memory 14 will be now adapted to supply, with the aid of the address representing the angle α, selected data in the sinusoidal table whose curve has the opposite sign to that previously.

Once again, neither the signal I(t), nor the signal Q(t) have a discontinuity.

FIG. 3, shows only one example of the waveforms able to be present in the modulator. The same process described above will occur at whatever moment a transition occurs in the signal D(t) with respect to the timescale determined by the time base 10.

Figure 6:
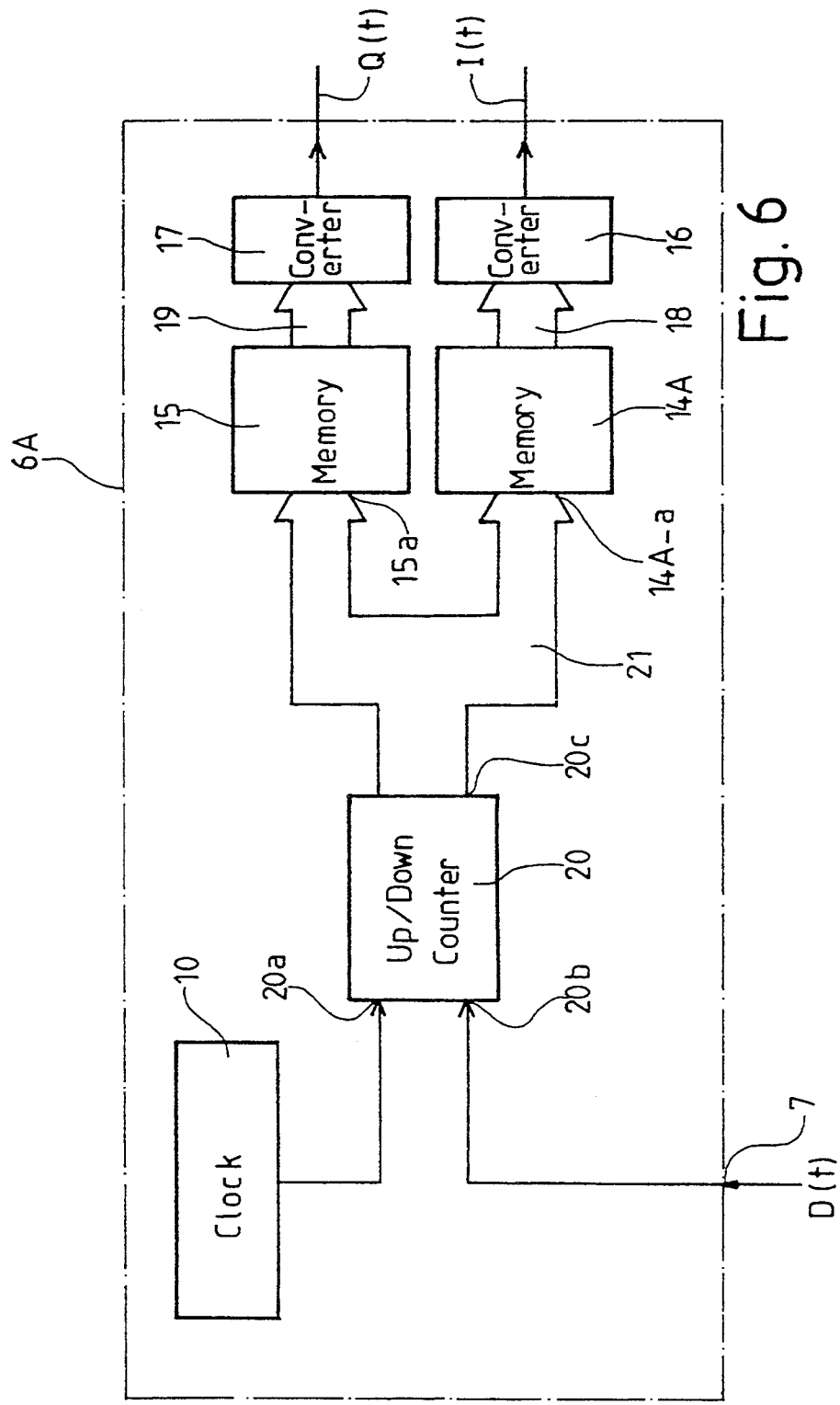
FIG. 6 represents another embodiment of the modulator according to the invention operating in digital mode.

FIG. 6, which will now be referred to, represents a second digital embodiment according to the invention, this figure representing only the second generator of the modulation signal I(t) and Q(t).

The generator indicated by the reference 6A comprises the components 10, 15 and 16 to 19 previously described with respect to FIG. 2, the counter 9 as well as the ROM memory 12 of the embodiment of FIG. 2 being replaced by an up/down counter 20.

The up/down counter 20 comprises a clock input 20a which is connected to the clock 10. Another input 20a constitutes its control terminal for counting up or counting down.

The up/down counter 20 also comprises an output 20c connected in parallel, by means of an N bit bus 21 to the input 15a of the memory 15 and also to the input 14A-a of a memory 14A which, as opposed to the memory 14 of the embodiment of FIG. 2, only includes a +sine table.

The up/down counter 20 inherently realizes the relation, $$\frac{d\alpha}{dt} = D(t) 2\pi \Delta f$$

that is to say the two characteristics which are at the base of the present invention, the sign inversion of the sine being realized by inverting the direction of counting by an appropriate command from the input 20b of the up/down counter 20. This inversion results in the face that the phase relation between the signals I(t) and Q(t) is modified by inverting the direction of variation of the arguments of the sine and of the cosine, which achieves the same result as that obtained by the first embodiment of the invention described in relation to FIG. 2.

Figure 7:
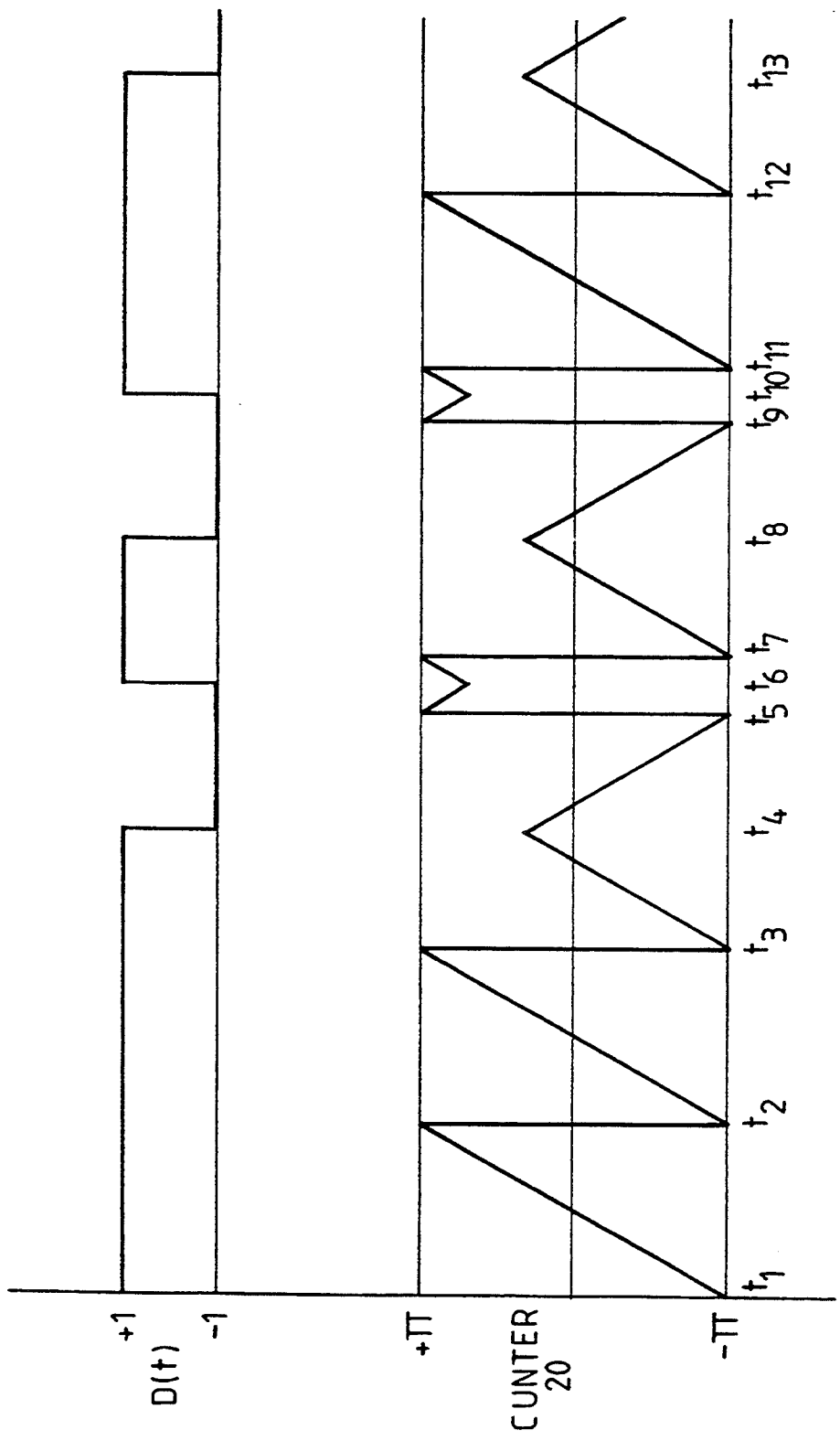
FIG. 7 shows wave forms illustrating the operation of the modulator represented in FIG. 6.

FIG. 7 shows a specific example of the contents of the counter 20 as a function of the useful signal D(t). The capacity of the counter 20 is equal to N bits, N being equal to 8, for example. In these conditions, the up/down counter 20 can count from 0 to 255, representing a range of values of the angle α from $-\pi + \Delta\alpha$ to $+\pi$.

The up/down counter 20 is arranged such that it counts from 0 to 255 or from 255 to 0, the direction of counting being determined by the value of the useful signal D(t).

It will thus be noted that, as opposed to the counter 9 of FIG. 1, the up/down counter 20 cannot charge a new value, but it can change the direction of counting.

As represented in the example of FIG. 7, in the absence of transitions, the up/down counter 20 counts from 0 to 255 (respectively between $t_1$ and $t_2$ and between $t_2$ and $t_3$ on this figure) at the pulse rate of the clock 10, and then returns to the zero position. The direction of counting may be reversed if the signal D(t) had an opposite value.

Remaining with the example of FIG. 7, at the time $t_4$, the signal D(t) passes from $+1$ to $-1$, inverting the direction of counting of the up/down counter 20. As a consequence, its contents reduce at the pulse rate of the clock 10, until attaining the zero position corresponding to the value $-\pi$ (instant $t_5$).

At the same instant, the up/down counter 20 jumps to the high position of 255 and at the following clock pulse, takes the value 254 etc. until the occurrence at time $t_6$ of a new transition (from $-1$ to $+1$) of the useful signal D(t) and an analogous process takes place thereafter with the jumps of position at the instants $t_7$, $t_9$, $t_{11}$ and $t_{12}$, and with the inversions of the direction of counting a% the instants $t_6$, $t_8$, $t_{10}$ and $t_{13}$. At each clock strike, the ROMs 14A and 15 thus receive a digital value representative of an angular value situated between $-\pi+\Delta\alpha$ and $+\pi$ which allows these ROMs to be addressed with the corresponding digital sine and cosine values converted thereafter in the respective digital to analog converters 16 and 17.

Figure 8:
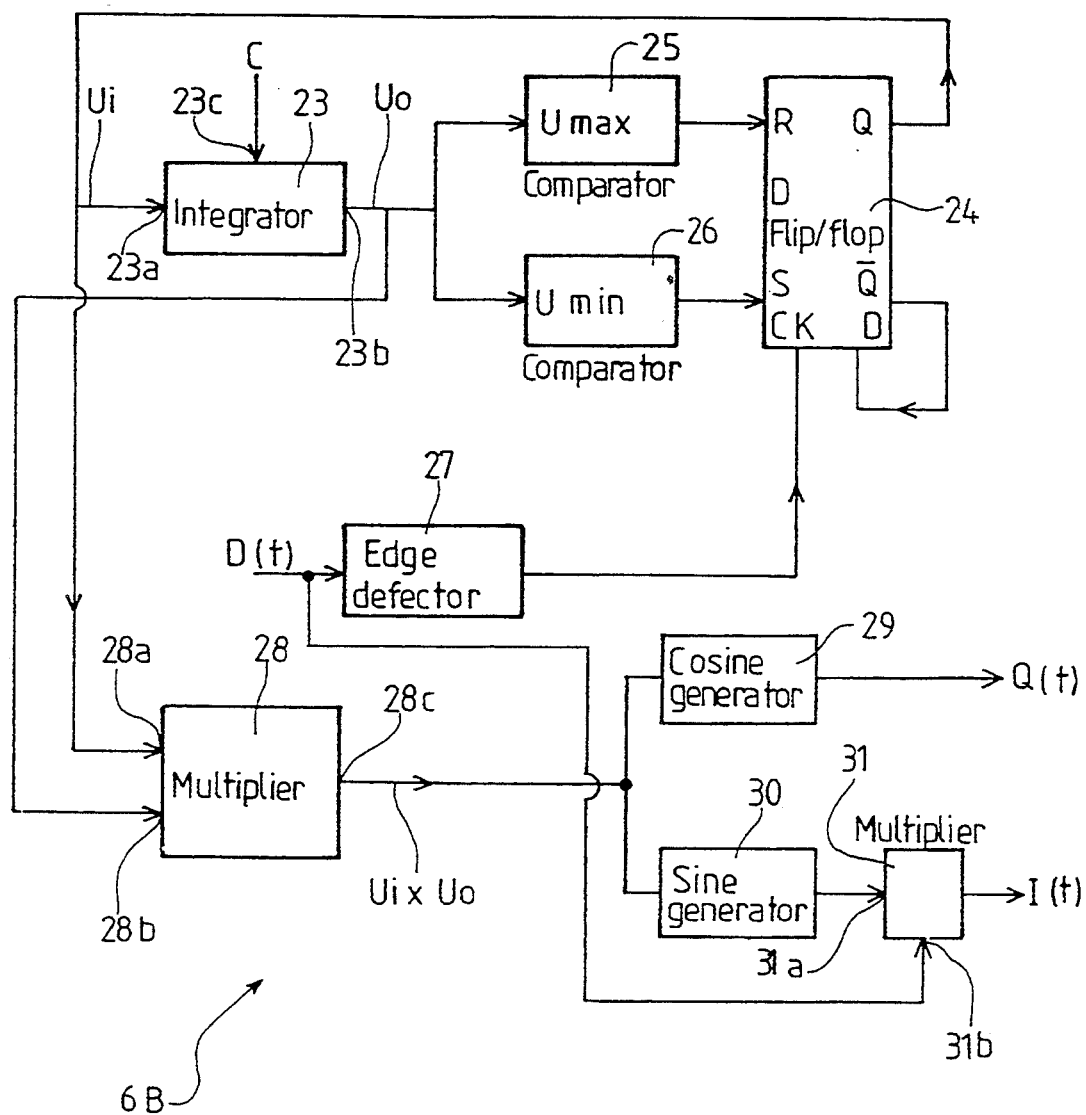
FIG. 8 represents yet another embodiment of the modulator according to the invention which has an analog operation.

FIG. 8 shall now be referred to, this figure representing a third embodiment according to the invention of the second generator of the modulation signals I(t) and Q(t). This third embodiment is designated by the general reference 6B and operates essentially in an analogous manner. It is inserted in the assembly of the modulator according to the invention in the same manner as the generators 6 and 6A of the previously described embodiment of the invention.

The generator 6B comprises an integrator 23 which receives at its input 23a a voltage Ui being able to have a high value $+1$ and a low value $-1$ as function of the position of a D flip flop 24 also incorporated in the assembly. From this input voltage Ui, the integrator 23 creates an output voltage Uo of the essentially triangular form $U_o = C \int U_i dt$ appearing at the output 23b of the integrator. The integrator 23 comprises an input 23c to which is applied a signal representitive of the constant C.

It would be noted that the constant C determines the frequency deviation $\Delta f$ (FIG. 1) according to the relation.

$$\Delta f = \frac{C}{U_{max} - U_{min}}$$

The output 23b of the integrator 23 is applied in parallel to two comparators 25 and 26 which are adapted to supply an output signal respectively when the signal Uo attains a maximum value Umax and a minimum value Umin between which the voltage Uo of the integrator 23 can be evaluated. The outputs of the comparators 25 and 26 are applied respectively to the inputs R and S of the D type flip flop 24.

The generator 6B further includes an edge detector 27 to which is applied the useful signal D(t) and whose output is connected to the input CK of the flip flop 24. The output $\overline{Q}$ of the flip flop 24 is connected to the input D, whilst the output Q is connected to the input 23a of the integrator 23.

A first input 28a of a multiplier 28 is also connected to the output Q of the flip flop 24 and also to the input 23a. The other input 28b of the multiplier 28 is connected to the output 23b of the integrator 23, so that the integrator effectuates the multiplication UixUo, this signal being present at the output 28c.

This output 28c is connected in parallel to a cosine generator 29 at the output of which appears the signal Q(t), and to a sine generator 30 the output of which is connected to the first input 31a of another multiplier 31 the other input 31b of which is connected to the terminal receiving the signal D(t) the output 31c of the multiplier 31 supplies the signal I(t).

Figure 9:
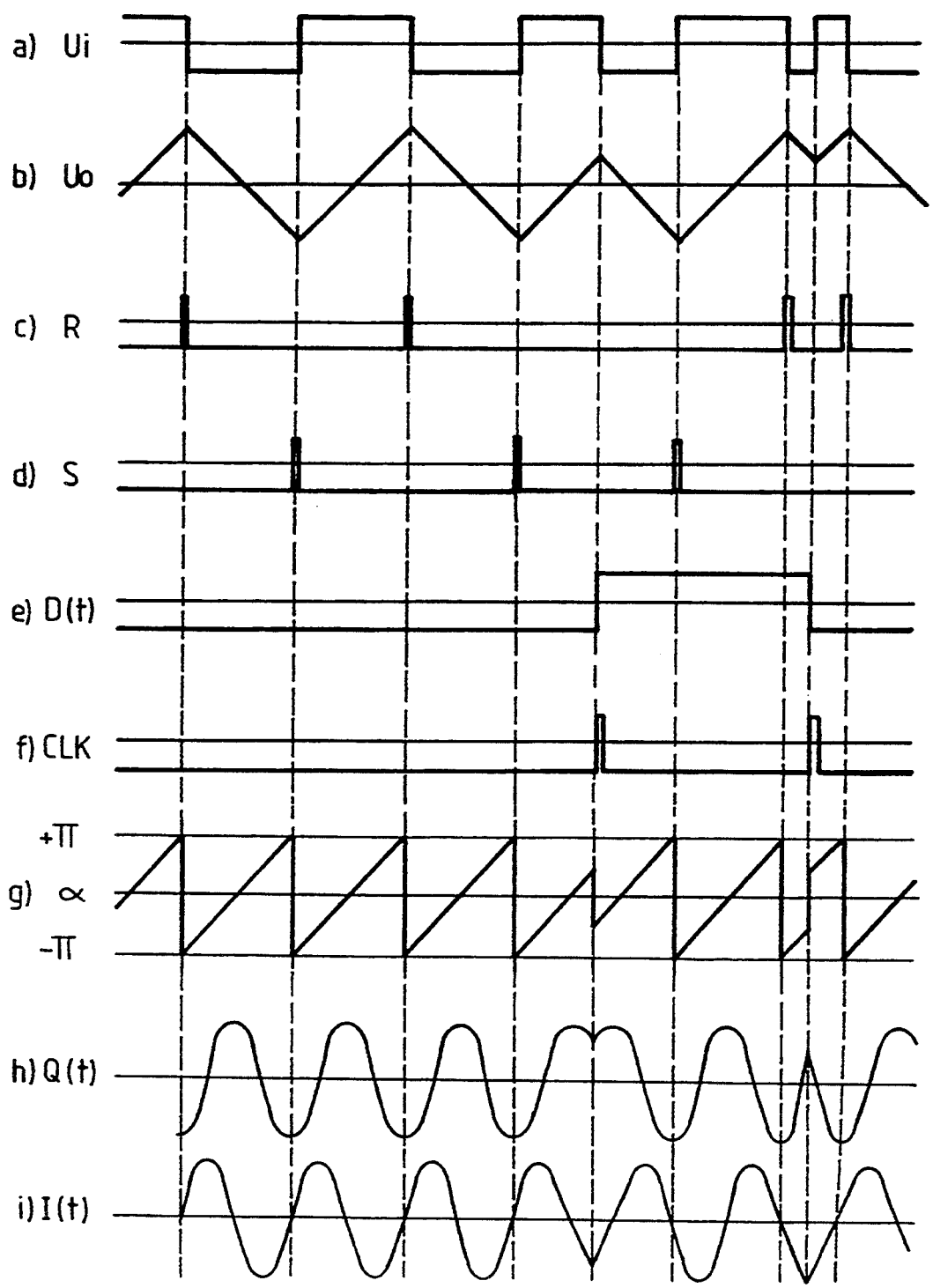
FIG. 9 is a diagram showing certain waveforms appearing in the modulator of FIG. 8.

The operation of the generator 6B that has just been described appears in FIG. 9.

The voltage Ui which is created at the output Q of the flip flop 24 has the value $+1$ or $-1$, as a function of the signals which are respectively applied to the input R and S of the flip flop 24, this being independent of the signal which is applied thereto at the input CK (curves a, c and d).

The inputs R and S receive respectively the output signals of the two comparators 25 and 26, when the output voltage of the integrator 23 attains its minimum or maximum value. This output voltage Uo is the integrated form of the voltage Ui, that is the voltage which comes from the output Q of the flip flop 24 (curve b).

At the moment that a transition of the useful signal D(t) takes place (curve e), the input CK of the flip flop 24 receives a pulse which changes the binary value of the output Q of the flip flop, which causes the inversion of the direction of evolution of the voltage Uo.

The voltages Ui and Uo being submitted to a multiplication operation in the multiplier 28, the output signal of the multiplicater (curve g) supplies the angular value $\alpha = $UixUo, the sign of which reflects the occurrence of the transitions of the useful signal D(t). In other words, the components 23 to 28 assure the inversion of the sign of the argument of the signals I(t) and Q(t).

The output signal 28c of the multiplier 28 controls the cosine and sine generators 29 and 30. The output signal of the sine generator 30 is multiplied by the signal D(t) in the multiplier 31, an operation which assures the phase shift of $k\pi$ of the sine signal issuing from the generator 30.

It will be noted that, according to one variation, the multiplier 31 may also be placed before the sine generator 30.

The signals Q(t) and I(t) are thus present respectively at the output of the generator 29 (curve h) and at the output 31c of the multiplier 31 (curve i).

We claim:

1. Modulator intended for use in a transmitter of an information transmission carrier signal in which binary information to be transmitted (D(t)) is in the form of frequency shift key code, said carrier signal being centered on a fictional frequency $f_c$, on either side of which are respectively emitted two real frequencies separated from the fictional frequency $f_c$ by a frequency $\Delta f$, according to whether the binary information has a high value $(+1)$ or a low value $(-1)$, said modulator comprising:

first generator means for creating a first carrier signal of the form $\sin(2\pi f_c t)$, and a second carrier signal of the form $\cos(2\pi f_c t)$, second generator means for creating, respectively as a function of the level of the binary information to be transmitted (D(t)), a first modulation signal (I(t)) of the form $\sin(2\pi \Delta f t)$ and a second modulation signal (Q(t)) of the form $\cos(2\pi \Delta f t)$, first multiplication means for mixing the first carrier signal and the first modulation signal, second multiplication means for mixing the second carrier signal and the second modulation signal, and means for adding the output signals of said first and second multiplication means and thus creating said signal to be transmitted (y(t)), said second generator means comprising:

first phase shifting means for, at each transition of said binary information, modifying by a value $k\pi$ the phase of said first modulation signal (I(t)), k being any odd number, and second phase shifting means for, simultaneously with the action of said first phase shifting means and at each transition of said binary information (D(t)), changing the signs of the arguments of said first and second modulation signals (I(t), Q(t)).

2. Modulator according to claim 1, said second generator means comprising means for creating a cosine signal, means for creating a sine signal, means for creating an angular signal according to the argument $\alpha$ said angular signal periodically evolving between a value $-\pi + \Delta\alpha$ and a value $+\pi$, said first phase shifting means comprising first control means for, at the occurrence of successive transitions of said binary information, changing the sign of the signal produced by said means for creating said sine signal, and said second phase shifting means comprising second control means for, at the occurrence of successive transitions of said binary information, changing the sign of the argument of the signal produced by said means for creating an angular signal.

3. Modulator according to claim 2, said means for creating said angular signal comprising a counter and a clock connected to said counter for periodically increasing the contents of said counter, the output of said counter being connected in parallel to two ROM memories so as to provided them with addresses representing the values of said angle argument ($\alpha$), a first of said ROM memories forming said means for creating the cosine signal and a second of said ROM memories forming said means for creating the sine signal.

4. Modulator according to claim 3, said second ROM memory being stored with plus sine values and with minus sine values, selectively addressable as a function of the binary value of said binary information (D(t)), with the aid of the addresses elaborated by said counter.

5. Modulator according to claim 2, said means for creating said angular signal comprising an up/down counter and a clock for periodically increasing or decreasing the contents of said up/down counter, said up/down counter being connected so as to change the direction of counting at each occurrence of a transitions of said binary information (D(t)), said up/down counter being further connected in parallel by its output to said means for creating respectively said cosine and sine signals.

6. Modulator according to claim 2, said means for creating said angular signal comprising an integrator, a circuit for applying to said integrator a rectangular signal (Ui) the transitions of which reflect the transitions of said binary information (D(t)), and a multiplier for multiplying the output (Uo) of said integrator with said rectangular signal, the output of said multiplier being connected in parallel to said means for creating respectively said cosine and sine signals, and said means for creating the sine signal being connected to a further multiplier, together with the binary information signal (D(t)), in order to create a sign change of the sine signal at transitions of said binary information signal (D(t)).

* * * * *